Dec. 2, 1930.  E. W. LITTLE  1,783,337
ATTACHMENT FOR WELDING MACHINES
Filed June 24, 1929  4 Sheets-Sheet 1

Inventor
EARL W. LITTLE
By Owen H. Spencer
Attorney

Dec. 2, 1930. E. W. LITTLE 1,783,337
ATTACHMENT FOR WELDING MACHINES
Filed June 24, 1929  4 Sheets-Sheet 2

Inventor
EARL W. LITTLE
By Owen H. Spencer
Attorney

Dec. 2, 1930.　　　　　　E. W. LITTLE　　　　　1,783,337
ATTACHMENT FOR WELDING MACHINES
Filed June 24, 1929　　　　4 Sheets-Sheet 3

Inventor
EARL W. LITTLE
By Owen H. Spencer
Attorney

Dec. 2, 1930.  E. W. LITTLE  1,783,337
ATTACHMENT FOR WELDING MACHINES
Filed June 24, 1929    4 Sheets-Sheet 4

Inventor
EARL W. LITTLE
By Owen H. Spencer
Attorney

Patented Dec. 2, 1930

1,783,337

UNITED STATES PATENT OFFICE

EARL W. LITTLE, OF INDIANAPOLIS, INDIANA

ATTACHMENT FOR WELDING MACHINES

Application filed June 24, 1929. Serial No. 373,101.

This invention relates to attachments for welding machines, such as are adapted primarily for the manufacture of bird cages and the like, and one feature of the invention is the provision of means for supporting the material from which the body of the cage is constructed in position for receiving the bands which ordinarily surround and hold the cage structure in rigid formation. A further feature of the invention is in so constructing the attachment that it may be attached to parts of the welding machine.

A further feature of the invention is in so mounting the cage supporting mechanism that it may be adjusted longitudinally for positioning the bands in position to contact with the electrodes of the welding machine.

A further feature of the invention is the provision of means for guiding the bands as they are welded to the parts of the cage.

A further feature of the invention is the provision of means for properly spacing the wires from which the body of the cage is constructed.

A further feature of the invention is the provision of means for insulating the cage carrying parts from the current carrying parts of the mechanism.

A further feature of the invention is the provision of means for temporarily locking the cage structure to the supporting elements.

A further feature of the invention is the provision of means for adjustably locking the electrode to the arm of the welding machine on which the cage supporting mechanism is mounted.

Other objects and advantages will be hereinafter more fully set forth and pointed out in the accompanying specification.

In the accompanying drawings which are made a part of this application,

Figure 1:
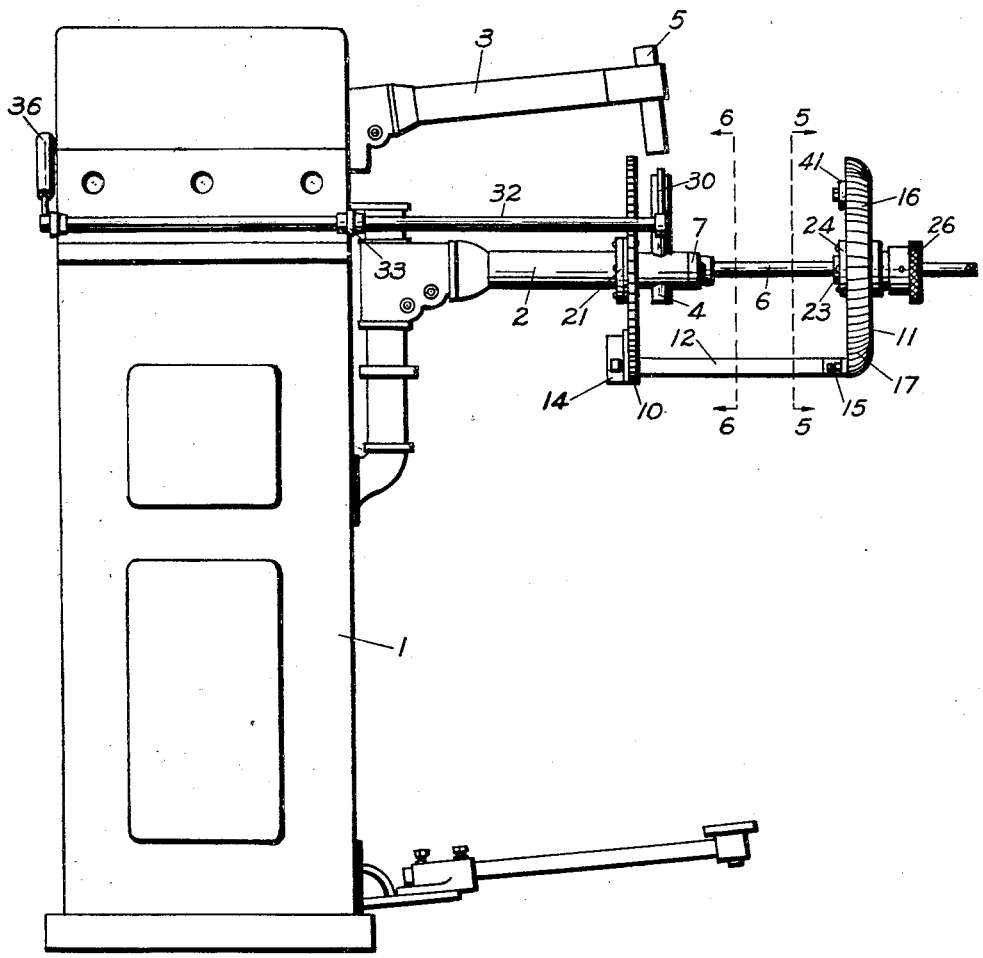
Figure 1 is a side elevation of a welding machine with a cage supporting mechanism attached thereto.
Figure 2:
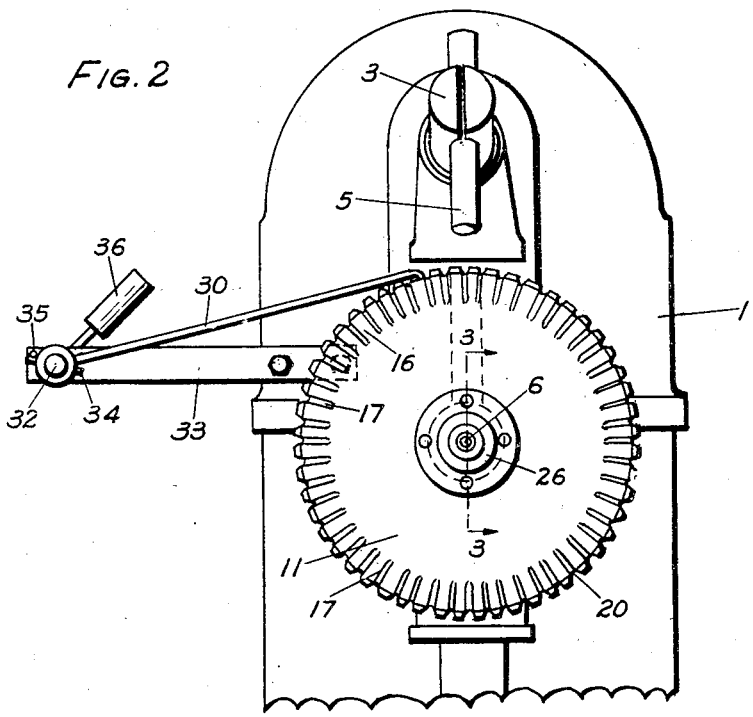
Figure 2 is a detail end elevation thereof.
Figure 3:
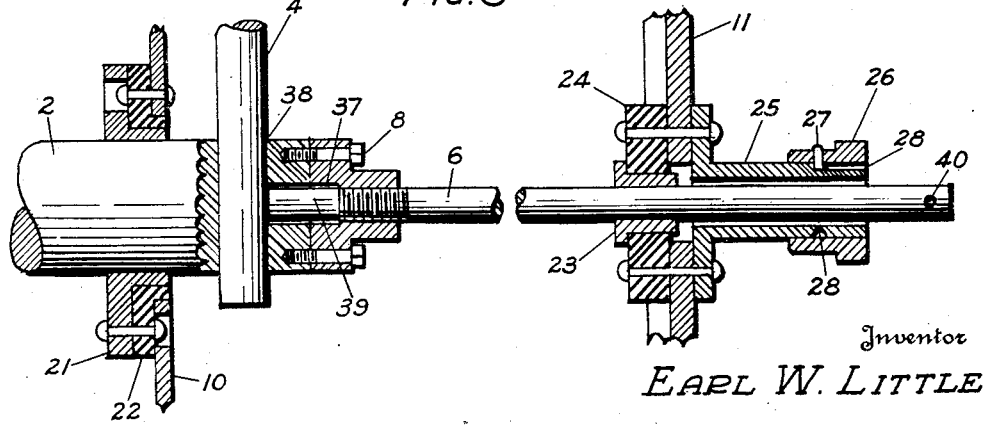
Figure 3 is an enlarged detail sectional view as seen along line 3—3, Fig. 2.
Figure 4:
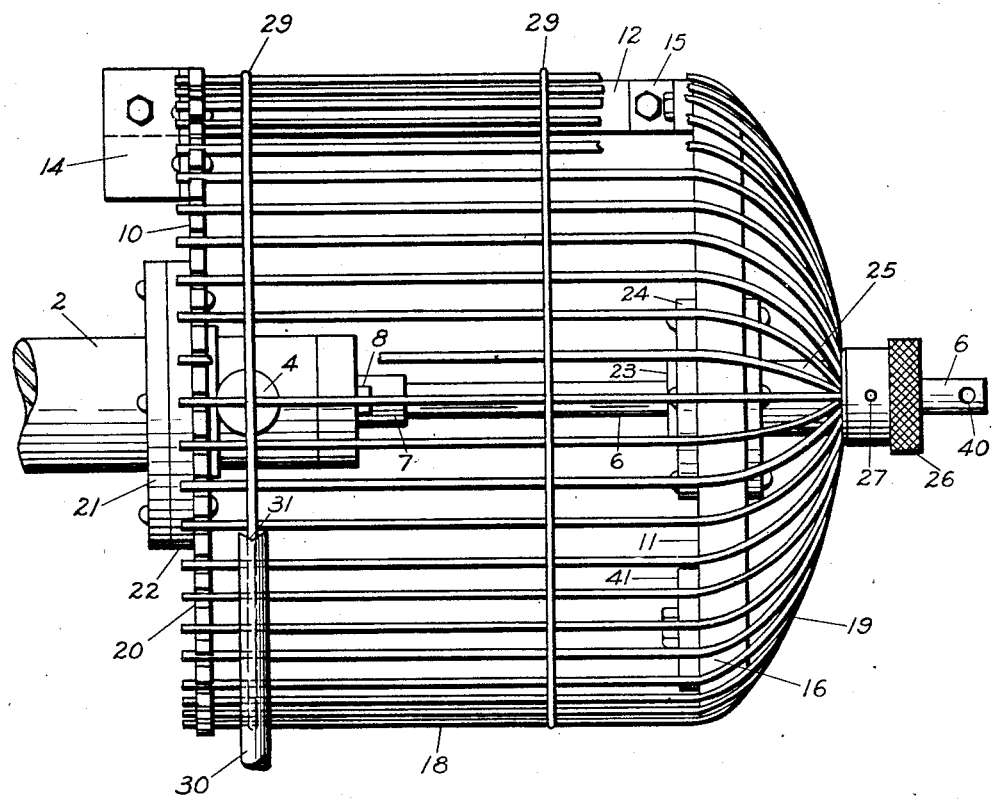
Figure 4 is an enlarged plan view of the cage supporting mechanism with a cage in position thereon.

Referring to the drawings in which similar reference numerals designate corresponding parts throughout the several views, the numeral 1 designates a welding machine, having a stationary arm 2 and a movable arm 3, said arms carrying electrodes 4 and 5, respectively adjacent their outer ends and which are adapted to be moved together to form a weld.

Attached to the welding machine 1, preferably to the free end of the arm 2, is a shaft 6, one end of the shaft threading into a socket 7, said socket being in turn attached to the end of the arm 2 by means of bolts 8 or the like.

Associated with the arm 2 and the shaft 6, is a cage supporting and shaping frame comprising a disc 10, which is slidably mounted on the arm 2, a shaper 11, which is slidably mounted on the shaft 6, and a connecting bar 12, one end of the bar 12 extending through a slot 13 in the edge of the disc 10 and being bolted between ears 14 on the outer face of the disc, while the opposite end of the bar 12 is bolted between ears 15 on the inner face of the shaper 11. This locks the disc 10 and shaper 11 in fixed relation with each other, so that both will move in unison both longitudinally and rotatably. The peripheral edge of the shaper 11 is curved from the inner edge to the outer face thereof to form a substantially oval surface 16, in which are formed spaced channels 17 for receiving the various wires 18 constituting the cage body, the curvature of the surface 16 properly shaping the wires 18 to form the curved top portion 19 of the cage, while the channels 17 properly space the wires with relation to each other. The peripheral edge of the disc 10 is provided with a plurality of notches 20, the upper edges of which are preferably inclined, so that the wires 18 will readily enter the notches and as these notches are in alignment with the channels 17, the wires will be held perfectly rigid and in fixed position during the welding operation.

The disc 10 is attached to a collar 21, which is slidable on the arm 2, the disc being insulated from the collar and arm by introducing a block 22, of insulating material between said collar and disc. The shaper 11 is carried by a ferrule 23, slidably mounted on the shaft 6, a block 24, of insulating material being introduced between the shaper and the ferrule. By mounting the disc and shaper in this manner, they will be fully insulated from the arm and shaft. The wires 18, forming the body of the cage, are soldered or otherwise connected together at one end in substantially ring formation and this portion of the cage structure is entered over a sleeve 25, attached to the outer face of the shaper 11 and surrounding the shaft 6, said sleeve being spaced from the shaft 6. The assembled wires 18 are held in position on the sleeve 25 by introducing a collar 26 over the outer end of the sleeve, after the wires have been placed over the sleeve, the collar having a pin 27 interiorly thereof, which enters a substantially bayonet shaped socket 28 in the periphery of the sleeve.

The prime object of the present invention is that of attaching one or more bands around the assembled wires 18 forming the body of the cage and to this end, after the cage structure has been secured over the sleeve 25 and locked thereon by the collar 26, a band 29 is slipped over the assembled wires 18, which brings the free ends thereof into engagement with the edges of the disc 10 and shaper 11. The band 29, which may be constructed of any suitable material, such as wire, is preferably placed midway between the disc and shaper, after which the wires 18 are entered in the respective channels 17 and the notches 20, the band being then moved to a point adjacent the free ends of the wires, or at the point where it is to be welded to the wires 18. Any additional number of bands may be placed over the assembled wires 18 and welded thereto, in this instance one additional band being shown.

After the band nearest the free ends of the wires 18 is in position to be welded to the wires, the cage carrying means is rotated until the bar 12 strikes against one face of the electrode 4, when the electrode 5 may be lowered and the wire 18 between the electrodes be welded to the band. The cage carrying mechanism is then rotated and as each succeeding wire 18 passes between the electrodes, the electrode 5 is lowered and a weld made.

The cage carrying mechanism is then moved inwardly until the next succeeding band is in line with the electrodes, when the welding operation is repeated as before.

In order to retain the band in proper alignment as it is being welded to the wires 18, a finger 30 is provided, the free end thereof having a notch 31 therein, which straddles the band 29 when the finger is lowered into engagement with the band and serves to guide the band as the cage mechanism is rotated. The opposite end of the finger 30 is attached to a shaft 32, rotatably mounted in brackets 33 on the welding machine 1, a pin 34, carried by the shaft 32, striking against a stud 35 for limiting the rotation of the shaft. The finger is normally retained in its adjusted positions by means of a counterweight 36.

Figure 7:
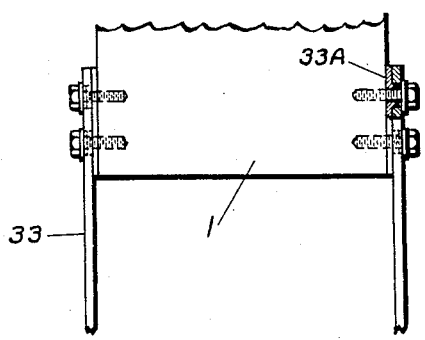
Figure 7 is a detail top plan view of a portion of the welding machine.
Figure 5:
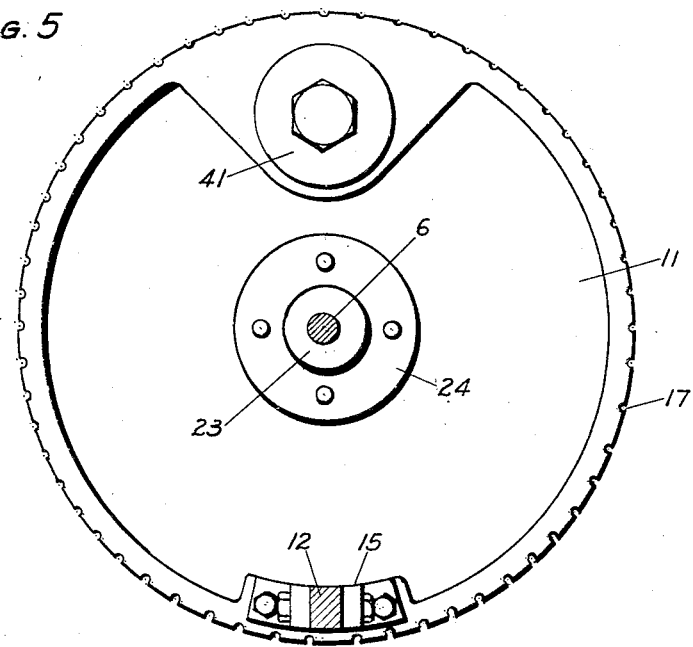
Figure 5 is an enlarged cross sectional view as seen along line 5—5, Fig. 1.
Figure 6:
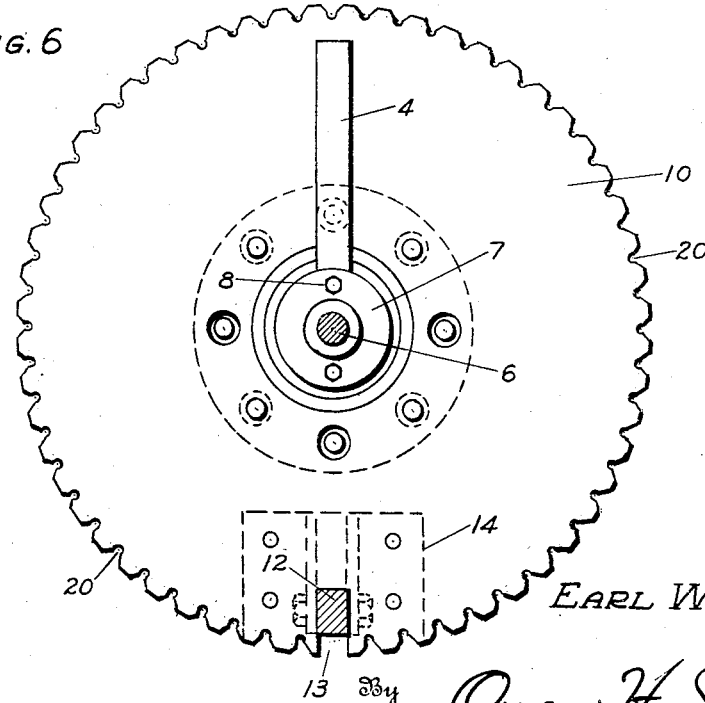
Figure 6 is a similar view as seen along line 6—6, Fig. 1.

The brackets 33 are insulated from the welding machine 1 by introducing blocks 33A, of insulating material between the face of the machine and the brackets, as indicated in Fig. 7.

It is absolutely essential that the electrode 4 be maintained at a prescribed adjusted relation with the wires to be welded, and as the most accurate adjustment can be made while a cage structure is mounted on the supporting element therefor, thus enclosing the end of the arm 2 and the electrode 4 within the confines of the cage structure, means must be provided for locking the electrode 4 in adjusted position or releasing the same, from a point exteriorly of the cage structure.

To this end a bore 37 is formed in the end of the arm 2, which communicates with the vertical bore 38, through which the electrode 4 extends and in the bore 37 is placed a pin 39, preferably of brass, said pin being forced against the electrode 4 by the shaft 6. The shaft 6 is provided near its outer end with an opening 40, through which any suitable instrument may be introduced for rotating the shaft 6 for releasing the same from the pin 39, when rotated in one direction and forced against the pin when rotated in the opposite direction.

When an adjustment is made of the electrode 4, necessitated from various causes, such as wearing down of the end of the electrode, welding cages of different diameters, or other causes, the shaft 6 is released from the pin 39 and an instrument of any nature introduced between the wires of the cage and the electrode 4 moved upwardly to the proper position, when the shaft 6 is rotated in the opposite direction until the pin 39 is again locked against the electrode 4.

With this construction, the electrode may be removed from the arm for releasing the cage carrying means from the arm 2 and shaft 6, or the height of the electrode may be adjusted without removing the shaft 6 from the end of the arm and while a cage is mounted thereon.

The connecting bar 12 is normally held adjacent one face of the electrode 4 by placing a counterweight 41 on the inner face of the shaper 11, the center of which is substantially diametrically opposite the bar 12.

In operating this device, the assembled ends of the wires 18, from which the body of the cage is constructed, is introduced over the sleeve 25 and the collar 26 then introduced over the sleeve and locked in position thereon. The cage carrying mechanism is then moved outwardly on the arm 2 and the shaft 6, until the disc 10 strikes against the electrode 4. A band 29 is then slipped over the shaper 11 until it is approximately midway between the disc and shaper, this operation forcing the loose ends of the wires 18 towards the disc and shaper.

The wires 18 are then manually or otherwise entered in the respective channels 17 and notches 20. A second band 29 is then introduced over the shaper 11 and cage structure carried thereby, when the first band is moved into position to be welded to the wires 18. As soon as the band is in position to be welded to the wires 18, the finger 30 is swung into engagement with the band for guiding the same. After the first band has been welded to the wires 18 the second band is positioned at the proper point on the wires 18 and the cage carrying structure moved inwardly until the new band is in registration with the electrodes, when the welding operation is repeated, and it will be understood that any suitable number of the bands may be welded to the wires 18.

While I have illustrated in a general way, certain instrumentalities which may be employed in carrying my invention into effect, it is evident that many modifications may be made in the various details, without departing from the scope of the appended claims, it being understood that my invention is not restricted to the particular examples herein described.

What I claim is:

1. In an attachment for welding machines, the combination with parts of a welding machine, of a shaft attached to said parts, a disc slidable on said machine part, a shaper slidable on said shaft, and a bar connecting said disc and shaper for causing them to act in unison.

2. An attachment for supporting a cage forming assemblage in position to be welded, comprising a disc, having a plurality of spaced notches in its edge for spacing the free ends of the cage forming wires, a shaper having a plurality of spaced channels at its periphery for spacing the cage forming wires forming the top portion of the cage, and means for connecting said disc and shaper in spaced relation with each other.

3. The combination with parts of a welding machine, and a shaft attached thereto, of a plurality of assembled wires for forming a cage, a supporting and shaping means for said wires, a band adapted to be introduced over the assembled cage forming wires for forcing them in engagement with said supporting and shaping means, and means for bringing said cage forming wires and said band in position to be welded together.

4. The combination with a welding machine, of a plurality of cage forming wires assembled together at one end, a combined supporting and shaping mechanism carried by parts of said welding machine, a band adapted to be introduced over the assemblage of cage forming wires for forcing said wires into engagement with said combined supporting and shaping mechanism, and means for successively positioning said cage forming wires in position to be welded to said band.

5. The combination with an arm of a welding machine, and an electrode extending therethrough, of a shaft attached to the end of said arm, a supporting and shaping structure adapted to support an assemblage of cage forming wires, said supporting and shaping member and said assemblage of wires enclosing said electrode and the adjoining ends of said arm and shaft, means for adjusting said shaft lengthwise for locking said electrode in adjusted position, and means for operating said shaft for releasing or locking said electrode when the cage forming wires are in position on said combined supporting and shaping means.

In testimony whereof, I have hereunto set my hand on this the 17th day of June, 1929, A. D.

EARL W. LITTLE.